US012808323B1

(12) United States Patent
Ziminsky

(10) Patent No.: US 12,808,323 B1
(45) Date of Patent: Nov. 24, 2026

(54) METHOD OF OPERATING A COMBUSTOR HAVING AN AXIAL FUEL STAGING SYSTEM WITH MOISTURIZED FUEL

(71) Applicant: GE Vernova Infrastructure Technology LLC, Greenville, SC (US)

(72) Inventor: Willy Steve Ziminsky, Greenville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/239,369

(22) Filed: Jun. 16, 2025

(51) Int. Cl.

| | |
|---|---|
| ***F02C 3/30*** | (2006.01) |
| ***F01K 17/02*** | (2006.01) |
| ***F01K 23/10*** | (2006.01) |
| ***F02C 6/18*** | (2006.01) |
| ***F02M 25/025*** | (2006.01) |
| ***F23R 3/00*** | (2006.01) |
| ***F23R 3/34*** | (2006.01) |
| ***F23R 3/36*** | (2006.01) |

(52) U.S. Cl.
CPC ................ *F02C 3/30* (2013.01); *F01K 17/02* (2013.01); *F01K 23/10* (2013.01); *F02C 6/18* (2013.01); *F02M 25/025* (2013.01); *F23R 3/002* (2013.01); *F23R 3/346* (2013.01); *F23R 3/36* (2013.01)

(58) Field of Classification Search
CPC .......... F01K 17/02; F01K 23/06; F01K 23/10; F02C 3/20; F02C 6/18; F02C 3/30; F23R 3/286; F23R 3/34; F23R 3/346; F23R 3/36
See application file for complete search history.

(56) References Cited

U.S. PATENT DOCUMENTS

| | | | | |
|---|---|---|---|---|
| 5,564,269 | A * | 10/1996 | Briesch | F01K 21/042 60/39.55 |
| 7,966,802 | B2 | 6/2011 | Szepek et al. | |
| 9,279,369 | B2 | 3/2016 | Romoser et al. | |
| 9,840,939 | B2 * | 12/2017 | Thomas | F02C 7/224 |
| 10,502,426 | B2 * | 12/2019 | Lemon | F23R 3/346 |
| 11,248,536 | B2 * | 2/2022 | Minto | F02C 3/30 |
| 2001/0049932 | A1 * | 12/2001 | Beebe | F23R 3/346 60/737 |
| 2010/0095649 | A1 * | 4/2010 | Blouch | F23R 3/36 60/39.463 |
| 2015/0192038 | A1 * | 7/2015 | Sharp | F01K 23/10 60/39.182 |
| 2015/0377126 | A1 | 12/2015 | Harper et al. | |

* cited by examiner

*Primary Examiner* — Kyle Robert Thomas
(74) *Attorney, Agent, or Firm* — Dority & Manning, P.A.

(57) ABSTRACT

Methods of operating a combustor in a first mode corresponding to a base-load of a gas turbine are provided. The combustor includes a combustion liner that extends between a forward end and an aft end. The combustion liner defines a combustion chamber having a primary combustion zone proximate the forward end and a secondary combustion zone aft of the primary combustion zone. The method includes providing a first mixture of a first fuel and air to the primary combustion zone via one or more fuel nozzles. The first fuel includes a first water to fuel ratio of zero. The method further includes providing a second mixture of a moisturized fuel and air to the secondary combustion zone via one or more fuel injectors. The fuel injectors are disposed downstream of the one or more fuel nozzles with respect to a flow of combustion gases within the combustion chamber.

13 Claims, 3 Drawing Sheets

METHOD OF OPERATING A COMBUSTOR HAVING AN AXIAL FUEL STAGING SYSTEM WITH MOISTURIZED FUEL

FIELD

The present disclosure relates generally to methods of operating a combustor having an axial fuel staging (AFS) system with moisturized fuel.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Turbomachines equipped with Dry Low NOx (DLN) combustion systems typically include combustors having multiple fuel nozzles at a forward end that provide a mixture of gaseous fuel and air to a combustion chamber. DLN combustor designs utilize lean premixed combustion to achieve low NOx emissions without using diluents such as water or steam. Lean premixed combustion involves premixing the fuel and air upstream of the combustor flame zone and operation near the lean flammability limit of the fuel to keep peak flame temperatures and NOx production low.

Issues exist with known methods of operating DLN combustion systems with diluents such as water or steam. For example, moisturizing fuel at the head end heavily impacts the Wobbe Number of the fuel, which is problematic for the combustion system because it reduces the operability window. Accordingly, an improved method of operating a gas turbine combustor using moisturized fuel is desired and would be appreciated in the art.

BRIEF DESCRIPTION

Aspects and advantages of the methods of operating a combustor of a gas turbine in accordance with the present disclosure will be set forth in part in the following description, or may be obvious from the description, or may be learned through practice of the technology.

In accordance with one embodiment, a method of operating a combustor in a first mode corresponding to a base-load of a gas turbine is provided. The combustor includes a combustion liner that extends between a forward end and an aft end. The combustion liner defines a combustion chamber having a primary combustion zone proximate the forward end and a secondary combustion zone aft of the primary combustion zone. The method includes providing a first mixture of a first fuel and air to the primary combustion zone via one or more fuel nozzles. The first fuel includes a first water to fuel ratio of zero. The method further includes providing a second mixture of a moisturized fuel and air to the secondary combustion zone via one or more fuel injectors. The fuel injectors are disposed downstream of the one or more fuel nozzles with respect to a flow of combustion gases within the combustion chamber.

In accordance with another embodiment, a method of operating a combustor in a first mode corresponding to a base-load of a gas turbine is provided. The combustor includes a combustion liner that extends between a forward end and an aft end. The combustion liner defines a combustion chamber having a primary combustion zone proximate the forward end and a secondary combustion zone aft of the primary combustion zone. The method includes providing a first mixture of a first fuel and air to the primary combustion zone via one or more fuel nozzles. The first fuel includes a first water to fuel ratio of zero. The method further includes providing a second fuel and water to a mixing unit to generate a moisturized fuel. The method further includes providing a second mixture of the moisturized fuel and air to the secondary combustion zone via one or more fuel injectors. The fuel injectors are disposed downstream of the one or more fuel nozzles with respect to a flow of combustion gases within the combustion chamber. The moisturized fuel includes relative humidity of greater than zero and up to saturation.

These and other features, aspects and advantages of the present methods of operating a combustor of a gas turbine will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present methods of operating a combustor of a gas turbine, including the best mode of making and using the present systems and methods, directed to one of ordinary skill in the art, is set forth in the specification, which makes reference to the appended figures, in which.

DETAILED DESCRIPTION

Figure 1:
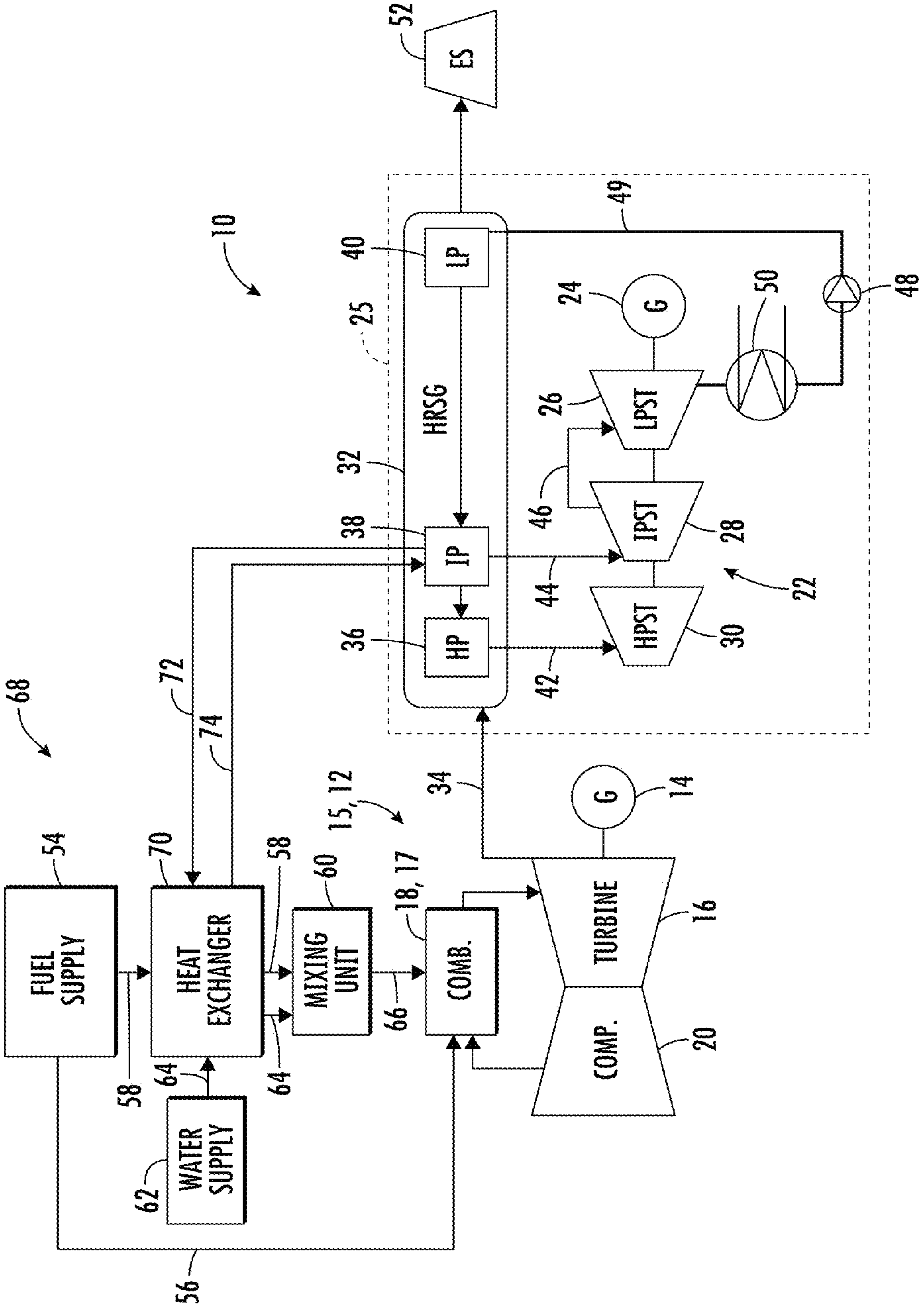
FIG. 1 a schematic diagram of a combined cycle power plant (CCPP) having a gas turbine in accordance with embodiments of the present disclosure.

Reference now will be made in detail to embodiments of the present methods of operating a combustor of a gas turbine, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, the phrase "and/or" is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "line" may refer to a pipe, hose, tube, or other fluid carrying conduit.

Referring now to the drawings, FIG. 1 provides a schematic diagram of a combined cycle system (CCS) or combined cycle power plant (CCPP) 10. The CCPP 10 may include a primary power generation system 15 for driving a first load 14 and a secondary (or recovery) power generation system 25 for driving a second load 24. In exemplary embodiments, the primary power generation system 15 may be a gas turbine 12 for driving the first load 14. The first load 14 may, for instance, be an electrical generator for producing electrical power. The gas turbine 12 may include a turbine section 16, combustors or a combustion section 18, and a compressor section 20. The turbine section 16 and the compressor section 20 may be connected by one or more shafts. The secondary power generation system 25 may be a steam turbine 22 for driving the second load 24.

During operation of the gas turbine 12, a working fluid such as air flows into the compressor section 20 where the air is progressively compressed, thus providing compressed air to the combustion section 18. The compressed air is mixed with fuel and burned within combustor(s) 17 of the combustion section 18 to produce combustion gases. The combustion gases flow through the hot gas path from the combustion section 18 into the turbine section 16, wherein energy (kinetic and/or thermal) is transferred from the combustion gases to the rotor blades in the turbine section 16, causing the one or more shafts to rotate. The mechanical rotational energy may then be used to power the compressor section 20 and/or to generate electricity and drive the first load 14. Exhaust gases 34 exiting the turbine section 16 may then be exhausted from the gas turbine 12 and into a heat recovery steam generator (HRSG) 32 that transfers heat from exhaust gases 34 of the gas turbine 12 to heat steam for the steam turbine 22.

The steam turbine 22 may drive the second load 24. The second load 24 may also be an electrical generator for generating electrical power. However, both the first and second loads 14, 24 may be other types of loads capable of being driven by the gas turbine 12 and the steam turbine 22. In addition, although the gas turbine 12 and the steam turbine 22 may drive separate loads 14 and 24, as shown in the illustrated embodiment, the gas turbine 12 and steam turbine 22 may also be utilized in tandem to drive a single load via a single shaft. In the illustrated embodiment, the steam turbine 22 may include a low-pressure section 26 (LPST), an intermediate-pressure section 28 (IPST), and a high-pressure section 30 (HPST). However, the specific configuration of the steam turbine 22, as well as the gas turbine 12, may be implementation-specific and may include any combination of sections.

The HRSG 32 may include multiple stages arranged in a serial flow order with respect to the exhaust gases 34 flowing through the HRSG 32. The components of the HRSG 32 in the illustrated embodiment are a simplified depiction of the HRSG 32 and are not intended to be limiting. Rather, the illustrated HRSG 32 is shown to convey the general operation of such HRSG systems. Heated exhaust gases 34 from the gas turbine 12 may be transported into the HRSG 32 and used to heat steam used to power the steam turbine 22.

For example, the HRSG 32 may include, in the serial flow order, a high pressure (HP) stage 36 (which may include a high pressure economizer and a high pressure evaporator); an intermediate pressure (IP) stage 38 (which may include an intermediate pressure economizer and an intermediate pressure evaporator); and a low pressure (LP) stage 40 (which may include a low pressure economizer and a low pressure evaporator). The high pressure stage 36 may generate high pressure and temperature steam (HP steam) that is provided to the HPST 30 via a high pressure steam line 42. The intermediate pressure stage 38 may generate intermediate pressure and temperature steam (IP steam) that is provided to the IPST 28 via an intermediate pressure steam line 44. Steam (which is at a low pressure/temperature) from the IPST 28 may be provided to an inlet of the LPST 26 via a low pressure steam line 46. That is, the LPST 28 is fluidly connected to the LPST 26 via the low pressure steam line 46. Exhaust from the LPST 26 of the steam turbine 22 may be directed into a condenser 50. Condensate from the condenser 50 may, in turn, be directed into the low pressure stage 40 of the HRSG 32 via a condensate line 49, e.g., with the aid of a condensate pump 48 disposed in fluid communication on the condensate line 49. Exhaust from the low pressure stage 40 may be directed into the intermediate pressure stage 38 and/or the HP stage 36 of the HRSG 32 (e.g., via one or more stage connection lines).

As mentioned above, exhaust gases 34 from the gas turbine 12 may be first routed through the HRSG 32, where a heat transfer takes place between the exhaust gases 34 and the various components of the HRSG 32 to generate steam, which is provided to the steam turbine 22. The exhaust gases 34 may then be provided to an exhaust stack 52, which may provide the exhaust gases 34 to the atmosphere.

In exemplary embodiments, the gas turbine 12 may further include a fuel supply system 68 having a fuel supply 54. The combustor(s) 17 of the combustion section 18 may be fluidly connected to the fuel supply 54, which may be configured to supply fuel to the combustor(s) 17 of the combustion section 18. The fuel from the fuel supply 54 may be a fuel mixture containing natural gas (such one or more of as methane, ethane, propane, or other suitable natural gas) and hydrogen. In other embodiments, the fuel from the fuel supply 54 may be pure natural gas (e.g., 100% natural gas) or pure hydrogen (e.g., 100% hydrogen, which may or may not contain some trace amount of contaminants), such that the first fuel is not a mixture of multiple fuels. In other embodiments, the fuel from the fuel supply 54 may be a mixture of hydrogen and natural gas, where hydrogen is the majority component (i.e., greater than 50%).

More specifically, as shown in FIG. 1, a first fuel supply line 56 may extend (e.g., directly) from the fuel supply 54 to the combustor(s) 17 of the combustion section 18 (e.g., to a forward end of the combustor). The first fuel supply line 56 may supply only fuel (e.g., not mixed with water) to the combustor(s) 17. Additionally, as shown, a second fuel supply line 58 may extend between, and fluidly connect, the fuel supply 54 and a mixing unit 60. The mixing unit 60 may be fluidly connected to a water supply 62, e.g., via a water supply line 64. Although not illustrated, the mixing unit 60 may include one or more fluid inlets (e.g., for receiving fuel and/or water), a mixing chamber, one or more agitators or mixing mechanisms, and a mixed fluid outlet (for providing the mixed fluid to the combustor). The mixing unit 60 may be configured for generating a moisturized fuel (i.e., by blending a gaseous fuel with steam). The moisturized fuel may be provided to the combustor(s) 17 via a moisturized fuel supply line 66. In this way, the fuel supply system 68 may advantageously provide only fuel (e.g., via the first fuel supply line 56) and/or moisturized fuel (e.g., via the moisturized fuel supply line 66) to the combustor(s) 17 depending on operating conditions of the gas turbine 12. Specifically, as will be described below in more detail, at part-load operating conditions of the gas turbine 12, only fuel (without water) may be provided to the combustor(s) 17. By contrast, at base-load operating conditions of the gas turbine 12, moisturized fuel may be provided to the combustor(s) 17.

In many embodiments, as shown, a heat exchanger 70 may be disposed in thermal communication on the second fuel supply line 58 and the water supply line 64 for heating fuel from the fuel supply 54 and the water from the water supply 62 (to generate steam) prior to mixing within the mixing unit 60. Specifically, the heat exchanger 70 may be disposed on the second fuel supply line 58 immediately downstream of the fuel supply 54 and immediately upstream of the mixing unit 60 with respect to the flow of fuel in the second fuel supply line 58. Additionally, the heat exchanger 70 may be disposed on the water supply line 64 immediately downstream of the water supply 62 and immediately upstream of the mixing unit 60 with respect to the flow of water in the water supply line 64.

The heat exchanger 70 may be fluidly connected to a thermal fluid supply. In exemplary embodiments, as shown, the thermal fluid supply may be the HRSG 32. More specifically, the heat exchanger 70 may be fluidly connected to the IP stage 38 of the HRSG 32 via a thermal fluid supply line 72 and a thermal fluid return line 74. For example, the thermal fluid supply line 72 may extend between the IP stage 38 of the HRSG 32 and the heat exchanger 70. The thermal fluid supply line 72 may supply a thermal fluid (e.g., steam) from the IP stage 38 of the HRSG 32 to the heat exchanger 70 for heating the fuel flowing through the second fuel supply line 58 prior to being mixed with water in the mixing unit 60. The thermal fluid return line 74 may extend between the heat exchanger 70 and the IP stage 38 of the HRSG 32. The thermal fluid return line may return the thermal fluid from the heat exchanger 70 to the HRSG 32.

Figure 2:
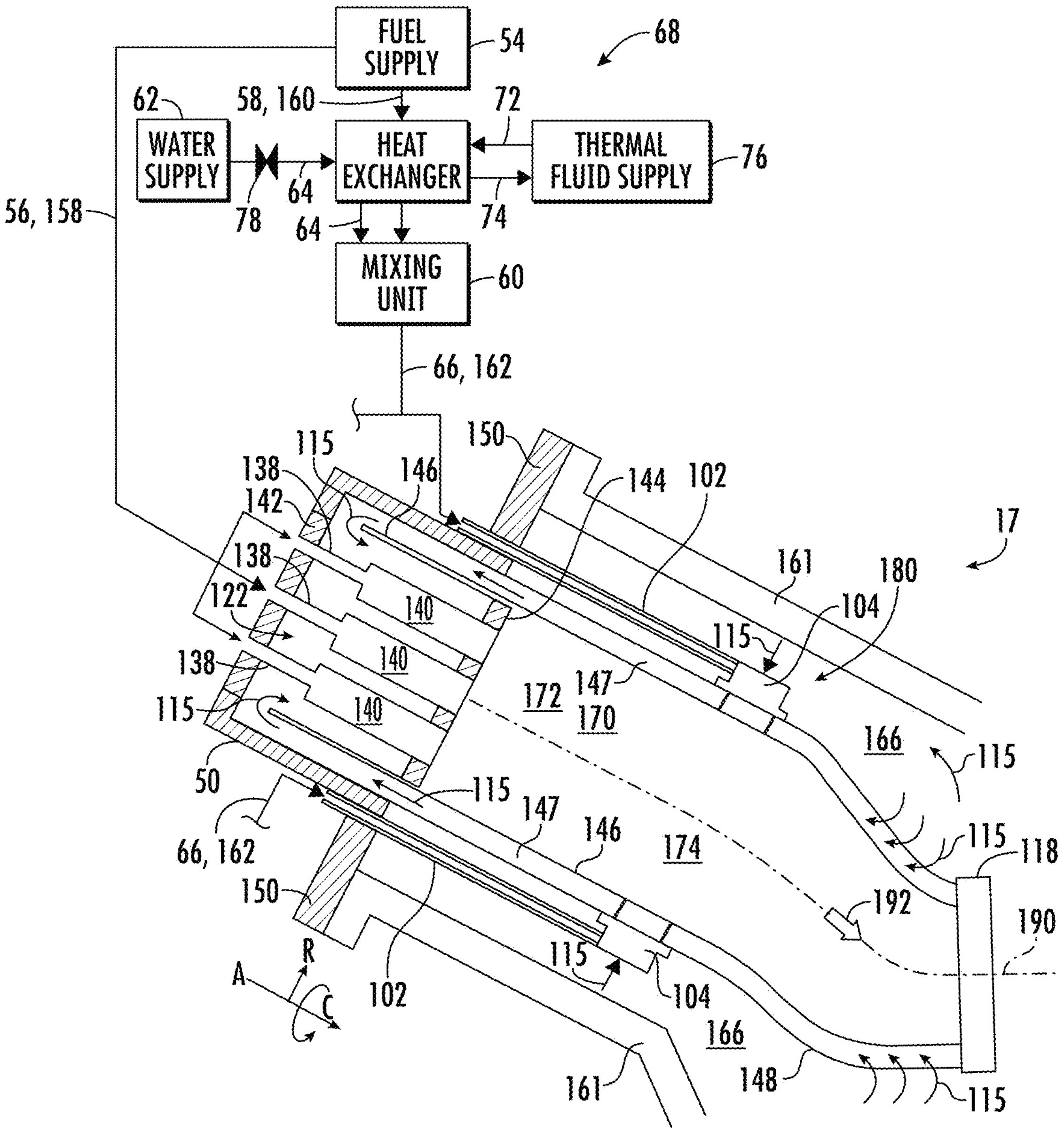
FIG. 2 illustrates a cross-sectional view of a combustor in accordance with embodiments of the present disclosure, as may be used with the gas turbine of the CCPP of FIG. 1.

FIG. 2 is a schematic representation of a combustor 17, as may be included in a can-annular combustion system for the gas turbine 12. In a can annular combustion system, a plurality of combustors 17 (e.g., 8, 10, 12, 14, 16, or more) are positioned in an annular array about the shaft that connects the compressor section 20 to the turbine section 16.

As shown in FIG. 2, the combustor 17 may define an axial direction A that extends along an axial centerline 190. The combustor 17 may also define a circumferential direction C which extends around the axial direction A and the axial centerline 190. The combustor 17 may further define a radial direction R perpendicular to the axial direction A and the axial centerline 190.

As shown in FIG. 2, the combustor 17 includes a combustion liner 146 that defines a combustion chamber 170. The combustion liner 146 may be positioned within (i.e., circumferentially surrounded by) an outer sleeve 148, such that an annulus 147 is formed therebetween. The combustion liner 146 may contain and convey combustion gases to the turbine section 16. The combustion liner 146 defines the combustion chamber 170 within which combustion occurs. As shown in FIG. 2, the combustion liner 146 may extend between fuel nozzles 140 and an aft frame 118. The combustion liner 146 may have a generally cylindrical liner portion and a tapered transition portion that is separate from the generally cylindrical liner portion, as in many conventional combustion systems. Alternately, the combustion liner 146 may have a unified body (or "unibody") construction, in which the generally cylindrical portion and the tapered portion are integrated with one another. Thus, any discussion of the combustion liner 146 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine section 16 are integrated into a single unit (e.g., without aft frame 118), sometimes referred to as a "transition nozzle" or an "integrated exit piece."

FIG. 2 illustrates a combustor 17 having both fuel nozzles 140 and one or more fuel injection assemblies 180 (also referred to as an axial fuel staging (AFS) system), as discussed further herein. The at least one fuel nozzle 140 may be positioned at the forward end of the combustor 17. Fuel may be directed through fuel supply conduits 138, which extend through an end cover 142, and into the fuel nozzles 140. The fuel nozzles 140 convey the fuel and compressed air 115 into a primary combustion zone 172, where combustion occurs. In some embodiments, the fuel and compressed air 115 are combined as a mixture (e.g., within the fuel nozzle 140) prior to reaching the primary combustion zone 172.

The combustion liner 146 may be surrounded by an outer sleeve 148, which is spaced radially outward of the combustion liner 146 to define an annulus 147 through which compressed air 115 flows to a forward, or head, end of the combustor 17. For example, compressed air 115 may enter the annulus 147 through the outer sleeve 148 (e.g., through impingement holes proximate the aft frame 118) and travel towards the end cover 142, such that the compressed air 115 within the annulus 147 flows opposite the direction of combustion gases 192 within the combustion liner 146. Heat is transferred convectively from the combustion liner 146 to the compressed air 115, thus cooling the combustion liner 146 and warming the compressed air 115.

In some embodiments, the outer sleeve 148 may include a flow sleeve and an impingement sleeve coupled to one another. The flow sleeve may be disposed at the forward end, and the impingement sleeve may be disposed at the aft end. Alternately, the outer sleeve 148 may have a unified body (or "unisleeve") construction, in which the flow sleeve and the impingement sleeve are integrated with one another in the axial direction. As before, any discussion of the outer sleeve 148 herein is intended to encompass both conventional combustion systems having a separate flow sleeve and impingement sleeve and combustion systems having a unisleeve outer sleeve.

The forward casing 150 and the end cover 142 of the combustor 17 define the head end air plenum 122, which includes the one or more fuel nozzles 140. The fuel nozzles 140 may be any type of fuel nozzle, such as bundled tube fuel nozzles (often referred to as "micromixers") or swirler nozzles (often referred to as "swozzles"). The fuel nozzles 140 may be positioned within the head end air plenum 122 defined at least partially by the forward casing 150. In many embodiments, the fuel nozzles 140 may extend from the end cover 142. For example, each fuel nozzle 140 may be coupled to an aft surface of the end cover 142 (e.g., via a flange). As shown in FIG. 2, the at least one fuel nozzle 140 may be partially surrounded by the combustion liner 146 or a cylindrical inlet flow conditioner (not separately labeled).

The forward casing 150 may be fluidly and mechanically connected to a compressor discharge casing 161, which defines a high pressure plenum 166 around the combustion liner 146 and the outer sleeve 148. Compressed air 115 from the compressor section 20 travels through the high pressure plenum 166 and enters the combustor 17 via apertures (not shown) in the downstream end of the outer sleeve 148 (as indicated by arrows near the aft frame 118). Compressed air 115 travels upstream through the annulus 147 and is turned by the end cover 142 to enter the fuel nozzles 140 and to cool the head end. In particular, compressed air 115 flows from high pressure plenum 166 into the annulus 147 at an aft end of the combustor 17, via openings defined in the outer sleeve 148. The compressed air 115 travels upstream from the aft end of the combustor 17 to the head end air plenum 122, where the compressed air 115 reverses direction and enters the fuel nozzles 140.

The fuel nozzles 140 may be in fluid communication with the fuel supply 54 of the fuel supply system 68, which may be configured to supply a first fuel 158 to the fuel nozzles 140 (e.g., via the first fuel supply line 56). The first fuel 158 may be a gaseous fuel in exemplary embodiments. In many embodiments, the first fuel 158 may be a fuel mixture containing natural gas (such one or more of as methane, ethane, propane, or other suitable natural gas) and hydrogen. In other embodiments, the first fuel 158 may be pure natural gas (e.g., 100% natural gas) or pure hydrogen (e.g., 100% hydrogen, which may or may not contain some trace amount of contaminants), such that the first fuel is not a mixture of multiple fuels. In other embodiments, the first fuel 158 may be a mixture of hydrogen and natural gas, where hydrogen is the majority component (i.e., greater than 50%). In exemplary embodiments, the first fuel 158 and compressed air 115 may mix together within the fuel nozzles 140 to form a first mixture of compressed air 115 and the first fuel 158 before being ejected (or injected) by the fuel nozzles 140 into the primary combustion zone 172.

No diluents, such as water (liquid or vapor) are provided with the first mixture of the first fuel 158 and the compressed air 115 to the primary combustion zone 172. That is, the first fuel 158 contains no water and is not moisturized. Only the first fuel 158 and the compressed air 115 are provided to the primary combustion zone 172 by the fuel nozzles 140. In other words, the fuel nozzles 140 only provide the first fuel 158 and the compressed air 115 to the primary combustion zone 172.

Additionally, no other diluents, such as water (liquid or vapor), are separately provided to the primary combustion zone 172. As discussed below, no water (specifically no fuel containing water) is introduced into the combustion chamber 170 until the secondary combustion zone 174.

In the exemplary embodiment, one or more fuel injection assemblies 180 are provided to deliver a second mixture of fuel, air, and water to a secondary combustion zone 174 downstream from the primary combustion zone 172. For example, a second flow of fuel 162, air 115, and water may be introduced by one or more fuel injectors 104 to the secondary combustion zone 174.

The primary combustion zone 172 and the secondary combustion zone 174 may each be portions of the combustion chamber 170 and therefore may be defined by the combustion liner 146. For example, the primary combustion zone 172 may be defined from an outlet of the fuel nozzles 140 to the fuel injector 104, and the secondary combustion zone 174 may be defined from the fuel injector 104 to the aft frame 118. In this arrangement, the forwardmost boundary of the fuel injector 104 may define the end of the primary combustion zone 172 and the beginning of the secondary combustion zone 174 (e.g., at an axial location where a second flow of fuel and air are introduced).

In exemplary embodiments, a second fuel 160 may be provided to the mixing unit 60 via the second fuel supply line 58 that extends between, and fluidly connects, the fuel supply 54 and the mixing unit 60. The second fuel 160 may be the same or different than the first fuel 158. The second fuel 160 may be a gaseous fuel in exemplary embodiments. The second fuel 160 may be a fuel mixture containing natural gas (such as one or more of methane, ethane, propane, or other suitable natural gas) and hydrogen. In other embodiments, the second fuel 160 may be pure natural gas (e.g., 100% natural gas) or pure hydrogen (e.g., 100% hydrogen, which may or may not contain some trace amount of contaminants), such that the second fuel 160 is not a mixture of multiple fuels. In other embodiments, the second fuel 160 may be a mixture of hydrogen and natural gas, where hydrogen is the majority component (i.e., greater than 50%).

The mixing unit 60 may be fluidly connected to the water supply 62, e.g., via the water supply line 64. Although not illustrated, the mixing unit 60 may include one or more fluid inlets (e.g., for receiving fuel and/or water), a mixing chamber, one or more agitators or mixing mechanisms, and a mixed fluid outlet (for providing the mixed fluid to the combustor). The mixing unit 60 may be configured for generating a moisturized fuel 162 (i.e., the second fuel 160 mixed with steam). The moisturized fuel 162 may be provided to fuel injector(s) 104 via the moisturized fuel supply line 66, which may be fluidly connected to conduits 102. The conduits 102 may each extend through the forward casing 150 and the high pressure plenum 166 and may fluidly connect to the fuel injector 104. As shown by the cut-off line in FIG. 2, the moisturized fuel 162 may be provided to each of the fuel injectors 104 via a respective conduit 102 that extends to a respective fuel injector 104.

In this way, the fuel supply system 68 may advantageously provide only the first fuel 158 (e.g., not mixed with water) to the fuel nozzles 140 and moisturized fuel 162 to the fuel injectors 104. As such, the moisturized fuel 162 is only provided to the secondary combustion zone 174, which advantageously reduces NOx production within the combustor 17 and increases combined cycle efficiency without reducing an operability window of the gas turbine 12. That is, the utilizing moisturized fuel at the fuel injectors 104 allows for more waste heat to be recovered at the bottoming cycle and allows for an increase of gas turbine firing temperature for the same or similar NOx production. Specifically, the moisturized fuel 162 may mix with compressed air 115 from the high pressure plenum 166 within the fuel injectors 104, and the mixture of moisturized fuel 162 and compressed air 115 may be provided to the secondary combustion zone 174 for generating combustion gases.

The heat exchanger 70 may be disposed in thermal communication on the second fuel supply line 58 and the water supply line 64 for heating the second fuel 160 from the fuel supply 54 and the water from the water supply 62 (to generate or further heat steam) prior to mixing within the mixing unit 60. Specifically, the heat exchanger 70 may be disposed on the second fuel supply line 58 immediately downstream of the fuel supply 54 and immediately upstream of the mixing unit 60 with respect to the flow of the second fuel 160 in the second fuel supply line 58. Additionally, the heat exchanger 70 may be disposed on the water supply line 64 immediately downstream of the water supply 62 and immediately upstream of the mixing unit 60 with respect to the flow of water in the water supply line 64. The heat exchanger 70 may be fluidly connected to a thermal fluid supply 76 via the thermal fluid supply line 72 and the thermal fluid return line 74. For example, the thermal fluid supply 76 may be the intermediate stage 38 of the HRSG 32 of the CCPP 10 described above with reference to FIG. 1 or a different thermal fluid supply. The heat exchanger 70 may advantageously heat the second fuel 160 and the water prior to mixing the fuel with the water within the mixing unit 60.

During certain operating conditions of the gas turbine 12 (FIG. 1) and/or the combustor 17, the fuel supply system 68 may only supply fuel (e.g., not mixed with water) to both the fuel nozzles 140 and the fuel injectors 104. For example, at part-load operating conditions of the gas turbine 12, only fuel (without water) may be provided to both the fuel nozzles 140 and the fuel injectors 104. For example, during part-load operating conditions, a valve 78 fluidly connected to the water supply line 64 may be modulated or actuated from an open position (in which water is permitted to flow into the mixing unit 60) to a closed position (in which water is prevented from flowing into the mixing unit 60), such that only the second fuel 160 is provided to the fuel injector 104 during part-load operating conditions. By contrast, at base-load operating conditions of the gas turbine 12 (FIG. 1) and/or the combustor 17, the fuel supply system 68 may only supply fuel (e.g., not mixed with water) to the fuel nozzles 140 and may supply moisturized fuel 162 to the fuel injectors 104. For example, during base-load, the valve 78 may be modulated from a closed position to an open position, thereby allowing water from the water supply to flow into the mixing unit 60.

Figure 3:
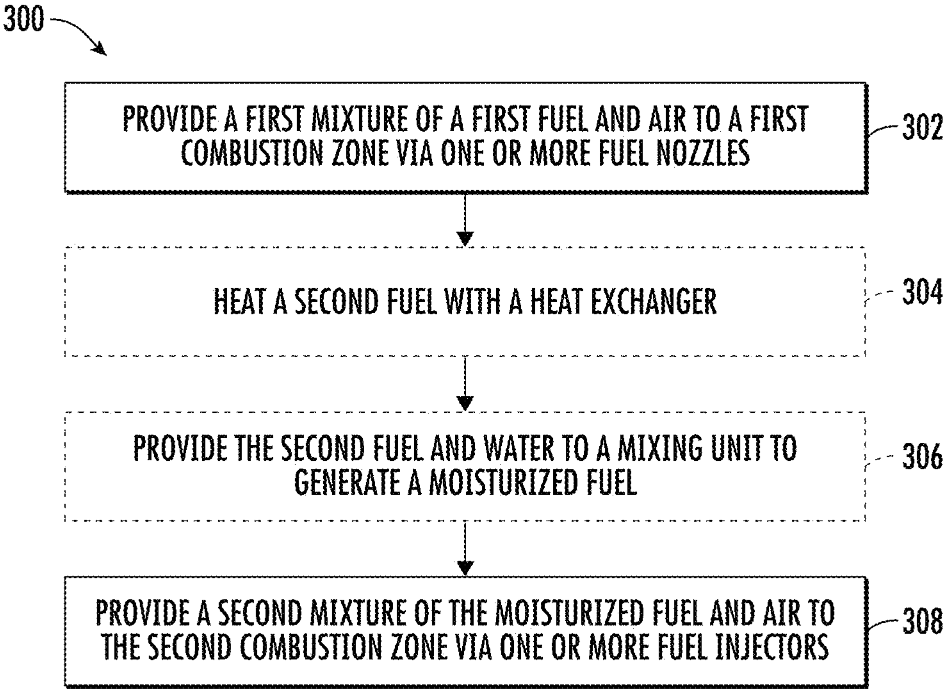
FIG. 3 is a flow chart of a method for operating a combustor of a gas turbine in accordance with embodiments of the present disclosure.

Referring now to FIG. 3, a flow diagram of a method 300 of operating a combustor in a first mode corresponding with a base-load of a gas turbine is illustrated in accordance with embodiments of the present disclosure. In general, the method 300 will be described herein with reference to the CCPP 10, the gas turbine 12, and the combustor 17 described above with reference to FIGS. 1 and 2. However, it will be appreciated by those of ordinary skill in the art that the disclosed method 300 may generally be utilized with any other suitable system configuration. In addition, although FIG. 3 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure. Dashed boxes indicate optional steps of the method 300.

As described above and shown in FIG. 2, the combustor 17 may include a combustion liner 146 that extends between a forward end and an aft end. The combustion liner 146 may define the combustion chamber 170 having the primary combustion zone 172 proximate the forward end and the secondary combustion zone 174 aft of the primary combustion zone 172. As shown in FIG. 3, the method 300 may include an initial step 302 of providing a first mixture of a first fuel 158 and air 115 to the primary combustion zone 172 via one or more fuel nozzles 140. The first fuel 158 may not contain any water, such that the air/fuel mixture provided by the fuel nozzles to the primary combustion zone 172 does not contain water. That is, the first fuel may include a water to fuel ratio that is zero. No diluents, such as water (liquid or vapor) are provided with the first mixture of the first fuel 158 and the compressed air 115 to the primary combustion zone 172. In other words, the first fuel 158 contains no water and is not moisturized. Only the first fuel 158 and the compressed air 115 are provided to the primary combustion zone 172 by the fuel nozzles 140. The fuel nozzles 140 only provide the first fuel 158 and the compressed air 115 to the primary combustion zone 172. Additionally, no other diluents, such as water (liquid or vapor), are separately provided to the primary combustion zone 172 (e.g., via means other than the fuel nozzles 140). As discussed below, no water (specifically no fuel containing water) is introduced into the combustion chamber 170 until the secondary combustion zone 174.

The method 300 may further include an optional step 304 of heating the second fuel 162 and the water with a heat exchanger 70 (e.g., prior to providing the second fuel 162 and the water to a mixing unit 60). For example, the second fuel 162 and the water may be provided (e.g., separately) to the heat exchanger 70, where the second fuel 162 and the water undergo a heat transfer in which heat from a thermal fluid is transferred to the second fuel 162 and the water via the heat exchanger 70. In many implementations, the method may include providing a thermal fluid to the heat exchanger 70 from a thermal fluid supply 76. For example, the thermal fluid supply 76 may provide or supply the thermal fluid to the heat exchanger 70 via the thermal fluid supply line 72, and the thermal fluid may be returned to the thermal fluid supply 76 via the thermal fluid return line 74. In exemplary embodiments, as shown in FIG. 1, the thermal fluid supply 76 may be the intermediate pressure stage 38 of the HRSG 32 of the CCPP 10. In other embodiments, the thermal fluid supply 76 may be a standalone thermal fluid supply.

In some implementations, the method 300 may include an optional step 306 of providing a second fuel 160 and water to a mixing unit 60 to generate a moisturized fuel 162. The mixing unit 60 may include one or more fluid inlets (e.g., for receiving fuel and/or water), a mixing chamber, one or more agitators or mixing mechanisms, and a mixed fluid outlet (for providing the moisturized fuel 162 to the fuel injectors 104). The mixing unit 60 may be configured for generating the moisturized fuel 162, e.g., through dynamic mixing with one or more agitators, static mixing with fixed structures (such as turbulators) within a flowpath or mixing chamber, jet mixing in which the water/fuel are combined with one another in two jetted streams, or other means for mixing the water/fuel to generate the moisturized fuel 162.

In exemplary implementations, the method 300 may further include a step 308 of providing a second mixture of a moisturized fuel 162 and air 115 to the secondary combustion zone 174 via one or more fuel injectors 104. As shown in FIG. 2, the fuel injectors 104 are disposed downstream of the one or more fuel nozzles 140 with respect to the flow of combustion gases 192 within the combustion chamber 170. By only providing moisturized fuel with the fuel injectors 104 to the secondary combustion zone 174 (e.g., downstream of the primary combustion zone 172), NOx formation may advantageously be reduced and higher combined cycle efficiency through waste heat recovery may be obtained. Additionally, the combustor may achieve a higher firing temperature than prior designs. That is, the utilizing moisturized fuel at the fuel injectors 104 allows for more waste heat to be recovered at the bottoming cycle and allows for an increase of gas turbine firing temperature for the same or similar NOx production.

The moisturized fuel may include a relative humidity of greater than zero and up to saturation. The relative humidity of the moisturized fuel is the percentage of the gas fuel's water vapor content compared to the gas fuel's maximum capacity (e.g., saturation) at a specific temperature and pressure. In various implementations, the moisturized fuel may include a relative humidity of greater than about 5%, or greater than about 10%, or greater than about 20%, or greater than 30%, or greater than about 40%, or greater than about 50%, or greater than about 75%, or greater than about 90%.

In various implementations, the fuel supply system 68 may only provide moisturized fuel 162 to the fuel injectors 104 during base-load operation of the gas turbine 12. That is, during part-load operation of the gas turbine 12, the fuel supply system 68 may provide only fuel (e.g., gaseous fuel not mixed with water) to both the fuel nozzles 140 and the fuel injectors 104. The combustor 17 may be operated in a first mode that corresponds with a base-load of the gas turbine 10 or a second mode that corresponds with a part-load of the gas turbine 10.

For example, the method may include operating the combustor in the second mode corresponding to a part-load of the gas turbine 12 by providing the first mixture of the first fuel 158 and air to the primary combustion zone 172 via the one or more fuel nozzles 140. The first fuel includes the first water to fuel ratio of zero (such that the first fuel 158 is not diluted with water). During the second mode corresponding with the part-load of the gas turbine 12, the method may include providing a third mixture of the second fuel 160 and air to the secondary combustion zone 174 via the one or more fuel injectors 104. The second fuel may include a second water to fuel ratio of zero (such that the second fuel 160 is not diluted with water during the part-load operation). For example, during part-load operation of the gas turbine 12, the valve 78 may be actuated to a closed position, thereby preventing water from the water supply 62 from flowing into the mixing unit 60. By contrast, during base-load, the valve 78 may be actuated to an open position, thereby providing water from the water supply 62 into the mixing unit 60.

The method may include, in some implementations, transitioning the combustor 17 from operating in the first mode corresponding to the base-load to operating in the second mode corresponding to a part-load of the gas turbine 12. Transitioning the combustor 17 to the second mode corresponding to the part-load may include reducing the water supplied to a mixing unit 62 such that the moisturized fuel 162 becomes a non-moisturized fuel having a water to fuel ratio of zero. In other words, once the gas turbine 12 is transitioned from base-load to part-load, the valve 78 may be actuated from the open position to a closed position, thereby reducing (or entirely preventing) the water to flowing into the mixing unit 60 to such that the moisturized fuel 162 becomes non-moisturized fuel, which may then be provided to the secondary combustion zone 174 via the fuel injectors 104.

By only providing moisturized fuel 162 to the secondary combustion zone 174 (e.g., via the fuel injectors 104) NOx production may be reduced and the combined cycle efficiency may be increased without reducing an operability window of the combustor 17. For example, utilizing moisturized fuel 162 may advantageously increase or enhance combined cycle efficiency and reduce harmful emissions. That is, the utilizing moisturized fuel at the fuel injectors 104 allows for more waste heat to be recovered at the bottoming cycle and allows for an increase of gas turbine firing temperature for the same or similar NOx production.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method of operating a combustor in a first mode corresponding to a base-load of a gas turbine, the combustor having a combustion liner extending between a forward end and an aft end, the combustion liner defining a combustion chamber having a primary combustion zone proximate the forward end and a secondary combustion zone aft of the primary combustion zone, the method comprising: providing a first mixture of a first fuel and air to the primary combustion zone via one or more fuel nozzles, wherein the first fuel includes a first water to fuel ratio of zero; and providing a second mixture of a moisturized fuel and air to the secondary combustion zone via one or more fuel injectors, the fuel injectors disposed downstream of the one or more fuel nozzles with respect to a flow of combustion gases within the combustion chamber.

The method as in any preceding clause, wherein the moisturized fuel includes a relative humidity of greater than zero and up to saturation.

The method as in any preceding clause, further comprising providing a second fuel and water to a mixing unit to generate the moisturized fuel.

The method as in any preceding clause, wherein the first fuel and the second fuel are different.

The method as in any preceding clause, wherein the first fuel and the second fuel are the same.

The method as in any preceding clause, further comprising heating the second fuel and the water with a heat exchanger prior to providing the second fuel and the water to the mixing unit.

The method as in any preceding clause, further comprising providing a thermal fluid to the heat exchanger from a thermal fluid supply.

The method as in any preceding clause, wherein the thermal fluid supply is an intermediate pressure stage of a heat recovery steam generator (HRSG) of a combined cycle power plant that includes the gas turbine.

The method as in any preceding clause, further comprising: operating the combustor in a second mode corresponding to a part-load of the gas turbine by: providing the first mixture of the first fuel and air to the primary combustion zone via the one or more fuel nozzles, wherein the first fuel includes the first water to fuel ratio of zero; and providing a third mixture of a second fuel and air to the secondary combustion zone via the one or more fuel injectors, wherein the second fuel comprises a second water to fuel ratio of zero.

The method as in any preceding clause, further comprising: transitioning the combustor from operating in the first mode to operating in a second mode by: reducing the water supplied to a mixing unit such that the moisturized fuel becomes a non-moisturized fuel having a water to fuel ratio of zero.

A method of operating a combustor in a first mode corresponding to a base-load of a gas turbine, the combustor having a combustion liner extending between a forward end and an aft end, the combustion liner defining a combustion chamber having a primary combustion zone proximate the forward end and a secondary combustion zone aft of the primary combustion zone, the method comprising: providing a first mixture of a first fuel and air to the primary combustion zone via one or more fuel nozzles, wherein the first fuel includes a first water to fuel ratio of zero; providing a second fuel and water to a mixing unit to generate a moisturized fuel; and providing a second mixture of the moisturized fuel and air to the secondary combustion zone via one or more fuel injectors, the fuel injectors disposed downstream of the one or more fuel nozzles with respect to a flow of combustion gases within the combustion chamber, wherein the moisturized fuel includes relative humidity of greater than zero and up to saturation.

The method as in any preceding clause, wherein the first fuel and the second fuel are different.

The method as in any preceding clause, wherein the first fuel and the second fuel are the same.

The method as in any preceding clause, further comprising heating the second fuel and water with a heat exchanger prior to providing the second fuel and water to the mixing unit.

The method as in any preceding clause, further comprising providing a thermal fluid to the heat exchanger from a thermal fluid supply.

The method as in any preceding clause, wherein the thermal fluid supply is an intermediate pressure stage of a heat recovery steam generator (HRSG) of a combined cycle power plant that includes the gas turbine.

The method as in any preceding clause, further comprising: operating the combustor in a second mode corresponding to a part-load of the gas turbine by: providing the first mixture of the first fuel and air to the primary combustion zone via the one or more fuel nozzles, wherein the first fuel includes the first water to fuel ratio of zero; and providing a third mixture of the second fuel and air to the secondary combustion zone via the one or more fuel injectors, wherein the second fuel comprises a second water to fuel ratio of zero.

The method as in any preceding clause, further comprising: transitioning the combustor from operating in the first mode to operating in the second mode by: reducing the water supplied to a mixing unit such that the moisturized fuel becomes a non-moisturized fuel having a water to fuel ratio of zero.

What is claimed is:

1. A method of operating a combustor in a first mode corresponding to a base-load of a gas turbine, the combustor having a combustion liner extending between a forward end and an aft end, the combustion liner defining a combustion chamber having a primary combustion zone proximate the forward end and a secondary combustion zone aft of the primary combustion zone, the method comprising:

providing a first mixture of a first fuel and air to the primary combustion zone via one or more fuel nozzles, wherein the first fuel includes a first water to fuel ratio of zero;

providing a second mixture of a moisturized fuel and air to the secondary combustion zone via one or more fuel injectors, the fuel injectors disposed downstream of the one or more fuel nozzles with respect to a flow of combustion gases within the combustion chamber, wherein the moisturized fuel comprises a gaseous fuel and steam;

providing combustion gases to a heat recovery steam generator (HRSG) that includes, in a serial flow order, a high pressure stage, an intermediate pressure stage, and a low pressure stage;

providing thermal fluid to a heat exchanger from the intermediate pressure stage via a thermal fluid supply line; and heating the gaseous fuel and the steam with the thermal fluid in the heat exchanger.

2. The method as in claim 1, wherein the moisturized fuel includes a relative humidity of greater than zero and up to saturation.

3. The method as in claim 1, further comprising providing the gaseous fuel and steam to a mixing unit to generate the moisturized fuel.

4. The method as in claim 3, wherein the first fuel and the gaseous fuel are different.

5. The method as in claim 3, wherein the first fuel and the gaseous fuel are the same.

6. The method as in claim 3, further comprising:

heating the gaseous fuel and the steam with the thermal fluid in the heat exchanger prior to providing the gaseous fuel and steam to the mixing unit to generate the moisturized fuel; and returning the thermal fluid from the heat exchanger to the HRSG.

7. The method as in claim 1, further comprising:

operating the combustor in a second mode corresponding to a part-load of the gas turbine by:

providing the first mixture of the first fuel and air to the primary combustion zone via the one or more fuel nozzles, wherein the first fuel includes the first water to fuel ratio of zero; and providing a third mixture of a second fuel and air to the secondary combustion zone via the one or more fuel injectors, wherein the second fuel comprises a second water to fuel ratio of zero.

8. The method as in claim 7, further comprising:

transitioning the combustor from operating in the first mode to operating in the second mode by:

reducing the steam supplied to a mixing unit such that the moisturized fuel becomes a non-moisturized fuel having a water to fuel ratio of zero.

9. A method of operating a combustor in a first mode corresponding to a base-load of a gas turbine, the combustor having a combustion liner extending between a forward end and an aft end, the combustion liner defining a combustion chamber having a primary combustion zone proximate the forward end and a secondary combustion zone aft of the primary combustion zone, the method comprising:

providing a first mixture of a first fuel and air to the primary combustion zone via one or more fuel nozzles, wherein the first fuel includes a first water to fuel ratio of zero;

providing a gaseous fuel and steam to a mixing unit to generate a moisturized fuel;

providing a second mixture of the moisturized fuel and air to the secondary combustion zone via one or more fuel injectors, the fuel injectors disposed downstream of the one or more fuel nozzles with respect to a flow of combustion gases within the combustion chamber, wherein the moisturized fuel includes relative humidity of greater than zero and up to saturation;

providing combustion gases to a heat recovery steam generator (HRSG) that includes, in a serial flow order, a high pressure stage, an intermediate pressure stage, and a low pressure stage;

providing thermal fluid to a heat exchanger from the intermediate pressure stage via a thermal fluid supply line; and heating the gaseous fuel and the steam with the thermal fluid in the heat exchanger.

10. The method as in claim 9, wherein the first fuel and the gaseous fuel are different.

11. The method as in claim 9, wherein the first fuel and the gaseous fuel are the same.

12. The method as in claim 9, further comprising:

operating the combustor in a second mode corresponding to a part-load of the gas turbine by:

providing the first mixture of the first fuel and air to the primary combustion zone via the one or more fuel nozzles, wherein the first fuel includes the first water to fuel ratio of zero; and providing a third mixture of a second fuel and air to the secondary combustion zone via the one or more fuel injectors, wherein the second fuel comprises a second water to fuel ratio of zero.

13. The method as in claim 12, further comprising:

transitioning the combustor from operating in the first mode to operating in the second mode by:

reducing the steam supplied to the mixing unit such that the moisturized fuel becomes a non-moisturized fuel having a water to fuel ratio of zero.

* * * * *